United States Patent
Sakuragi

(10) Patent No.: US 10,832,459 B2
(45) Date of Patent: Nov. 10, 2020

(54) THREE-DIMENSIONAL IMAGE DISPLAY APPARATUS FOR DISPLAYING TARGET TO WHICH COLOR IS ASSIGNED

(71) Applicant: FUJIFILM Corporation, Tokyo (JP)

(72) Inventor: Futoshi Sakuragi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/520,380

(22) Filed: Jul. 24, 2019

(65) Prior Publication Data
US 2019/0347839 A1 Nov. 14, 2019

Related U.S. Application Data

(63) Continuation of application No. PCT/JP2018/007611, filed on Feb. 28, 2018.

(30) Foreign Application Priority Data

Feb. 28, 2017 (JP) ................................ 2017-037062

(51) Int. Cl.
*G06T 11/40* (2006.01)
*G06T 19/20* (2011.01)
*G06T 15/08* (2011.01)

(52) U.S. Cl.
CPC .............. *G06T 11/40* (2013.01); *G06T 15/08* (2013.01); *G06T 19/20* (2013.01); *G06T 2200/04* (2013.01); *G06T 2207/10081* (2013.01)

(58) Field of Classification Search
CPC ......... G06T 11/40; G06T 15/04; G06T 15/06; G06T 15/08; G06T 19/20; G06T 2200/04; G06T 2207/10081
See application file for complete search history.

(56) References Cited

U.S. PATENT DOCUMENTS 8,334,867 B1 * 12/2012 Davidson ............ G06F 3/04815
345/419
2007/0262983 A1 11/2007 Choi
(Continued)

FOREIGN PATENT DOCUMENTS

JP H10-031753 A 2/1998
JP 2001-202527 A 7/2001
(Continued)

OTHER PUBLICATIONS

International Search Report issued in PCT/JP2018/007611; dated Apr. 3, 2018.
Written Opinion issued in PCT/JP2018/007611; dated Apr. 3, 2018.

*Primary Examiner* — Phuc N Doan
(74) *Attorney, Agent, or Firm* — Studebaker & Brackett PC

(57) ABSTRACT

The three-dimensional image processing apparatus includes a surface data generation unit that extracts a display target from a three-dimensional image and generates surface data indicating a surface of the display target, a color information acquisition unit that performs a volume rendering process for the three-dimensional image of a specific section including a vertex of the surface data in a direction from the outside to the inside of a surface forming the surface data to acquire color information and assigns a color to the surface of the surface data on the basis of the color information, and a display control unit that displays the surface data having the surface, to which the color has been assigned, on a display unit.

8 Claims, 3 Drawing Sheets

(56) References Cited

U.S. PATENT DOCUMENTS

| | | | |
|---|---|---|---|
| 2011/0069070 A1* | 3/2011 | Engel | G06T 15/08 345/426 |
| 2013/0141451 A1* | 6/2013 | Child | G06T 15/83 345/582 |
| 2013/0169638 A1* | 7/2013 | Carbonera | G06T 17/00 345/424 |
| 2014/0003695 A1* | 1/2014 | Dean | A61B 5/1075 382/131 |
| 2015/0022523 A1* | 1/2015 | Murray | G06T 15/08 345/426 |
| 2015/0029184 A1* | 1/2015 | Masumoto | G09B 23/30 345/419 |

FOREIGN PATENT DOCUMENTS

| | | |
|---|---|---|
| JP | 2009-536859 A | 10/2009 |
| JP | 2012-221448 A | 11/2012 |
| JP | 2013-222361 A | 10/2013 |

\* cited by examiner

THREE-DIMENSIONAL IMAGE DISPLAY APPARATUS FOR DISPLAYING TARGET TO WHICH COLOR IS ASSIGNED

CROSS-REFERENCE TO RELATED APPLICATIONS

This application is a continuation application of International Application No. PCT/JP2018/007611, filed Feb. 28, 2018, the disclosure of which is incorporated herein by reference in its entirety. Further, this application claims priority from Japanese Patent Application No. 2017-037062, filed Feb. 28, 2017, the disclosure of which is incorporated herein by reference in its entirety.

BACKGROUND

Field of the Invention

The present invention relates to a three-dimensional image processing apparatus, a three-dimensional image processing method, and a three-dimensional image processing program that generate surface data of a display target from a three-dimensional image, assign a color to a plane of the surface data, and display the surface data.

Related Art

In recent years, a technique has been proposed which extracts regions, such as the heart and the liver, from a three-dimensional image created using the images captured by, for example, a computed tomography (CT) apparatus, assigns triangular patches to a boundary surface between the extracted regions to generate surface data, and displays the surface data.

For example, JP2013-222361A discloses a technique that extracts a liver region from a three-dimensional image, generates surface data of the liver region, attaches a texture indicating a predetermined uneven pattern to a surface of the surface data, and displays the surface data.

In addition, JP2001-202527A discloses a technique which generates a texture, to which depth information has been added, in advance and attaches textures to the front and rear sides of the surface of a polygon according to the depth information to perform three-dimensional display in a case in which surface data of an object with an irregular shape, such as a cloud, is displayed.

However, in a case in which surface data is displayed, the color of the surface data is basically a single color and is suitable for checking the structure of an object. However, this configuration has the disadvantage that, in a case in which a plurality of objects, such as organs, are mixed, it is difficult to check the boundary between the plurality of objects. In addition, this configuration has the disadvantage that the surface data looks like an artifact different from the actual object.

In contrast, in a volume rendering process, colors are assigned to voxels of a three-dimensional image and integration is performed by, for example, ray casting to achieve display in various colors. Therefore, even in a case in which a plurality of objects are mixed, it is possible to check the boundary and to display an object close to the actual object.

However, in a case in which the volume rendering process is performed for the entire three-dimensional image, the load of an arithmetic process increases and it is difficult to perform display at a high speed. In addition, it takes a lot of time to adjust colors.

In the configuration disclosed in JP2013-222361A and JP2001-202527A, a texture is generated in advance and is assigned in a case in which surface data is displayed actual object. This configuration makes it possible to display an object close to the actual image. However, it is difficult to easily adjust colors unlike volume rendering.

SUMMARY

The invention has been made in view of the above-mentioned problems and an object of the invention is to provide a three-dimensional image processing apparatus, a three-dimensional image processing method, and a three-dimensional image processing program that can display surface data as in volume rendering and easily adjust colors.

According to the invention, there is provided a three-dimensional image processing apparatus comprising: a surface data generation unit that extracts a display target from a three-dimensional image and generates surface data indicating a surface of the display target; a color information acquisition unit that performs a volume rendering process for the three-dimensional image of a specific section including vertices of the surface data in a direction from the outside to the inside of planes forming the surface data to acquire color information and assigns a color to the surface of the surface data on the basis of the color information; and a display control unit that displays the surface data having the surface, to which the color has been assigned, on a display unit.

In the three-dimensional image processing apparatus according to the invention, the color information acquisition unit may set a normal direction to a vertex of each plane forming the surface data and perform the volume rendering process in the normal direction from the outside to the inside of each plane forming the surface data.

In the three-dimensional image processing apparatus according to the invention, the color information acquisition unit may calculate the normal direction to the vertex on the basis of normal directions to a plurality of planes intersecting the vertex.

In the three-dimensional image processing apparatus according to the invention, the color information acquisition unit may calculate an average of the normal directions to the plurality of planes intersecting the vertex to calculate the normal direction to the vertex.

In the three-dimensional image processing apparatus according to the invention, in the volume rendering process, the color information acquisition unit may set a color and opacity corresponding to a voxel value of each voxel in the specific section and add the color and the opacity corresponding to the voxel value along the normal direction.

The three-dimensional image processing apparatus according to the invention may further comprise a color change receiving unit that receives a change in a color depending on the voxel value.

In the three-dimensional image processing apparatus according to the invention, the color information acquisition unit may perform the volume rendering process for a three-dimensional image of the specific section having each vertex of the surface data as a center to acquire the color information of each vertex and perform an interpolation process for the color information of each vertex to assign the color to the surface of the surface data.

In the three-dimensional image processing apparatus according to the invention, the color information acquisition unit may set a section in which the display target is continuous from each vertex of the surface data in the normal direction as the specific section.

According to the invention, there is provided a three-dimensional image processing method comprising: extracting a display target from a three-dimensional image and generating surface data indicating a surface of the display target; performing a volume rendering process for the three-dimensional image of a specific section including vertices of the surface data in a direction from the outside to the inside of a plane forming the surface data to acquire color information; assigning a color to the surface of the surface data on the basis of the color information; and displaying the surface data having the surface, to which the color has been assigned, on a display unit.

According to the invention, there is provided a three-dimensional image processing program that causes a computer to function as: a surface data generation unit that extracts a display target from a three-dimensional image and generates surface data indicating a surface of the display target; a color information acquisition unit that performs a volume rendering process for the three-dimensional image of a specific section including vertices of the surface data in a direction from the outside to the inside of planes forming the surface data to acquire color information and assigns a color to the surface of the surface data on the basis of the color information; and a display control unit that displays the surface data having the surface, to which the color has been assigned, on a display unit.

Another three-dimensional image processing apparatus according to the invention comprises a memory that stores commands to be executed by a computer and a processor that is configured to execute the stored commands. The processor performs a process of extracting a display target from a three-dimensional image and generating surface data indicating a surface of the display target, a process of performing a volume rendering process for the three-dimensional image of a specific section including a vertex of the surface data in a direction from the outside to the inside of planes forming the surface data to acquire color information and assigning a color to the surface of the surface data on the basis of the color information, and a process of displaying the surface data having the surface, to which the color has been assigned, on a display unit.

According to the three-dimensional image processing apparatus, the three-dimensional image processing method, and the three-dimensional image processing program of the invention, a display target is extracted from a three-dimensional image and surface data indicating a surface of the display target is generated. Then, a volume rendering process is performed for the three-dimensional image of a specific section including a vertex of the surface data in a direction from the outside to the inside of planes forming the surface data to acquire color information and a color is assigned to the surface of the surface data on the basis of the color information. Then, the surface data having the surface, to which the color has been assigned, is displayed on a display unit. Therefore, it is possible display the surface data of the display target as in volume rendering. In addition, it is possible to easily adjust colors only by changing a color template used in the volume rendering process.

DETAILED DESCRIPTION

Figure 1:
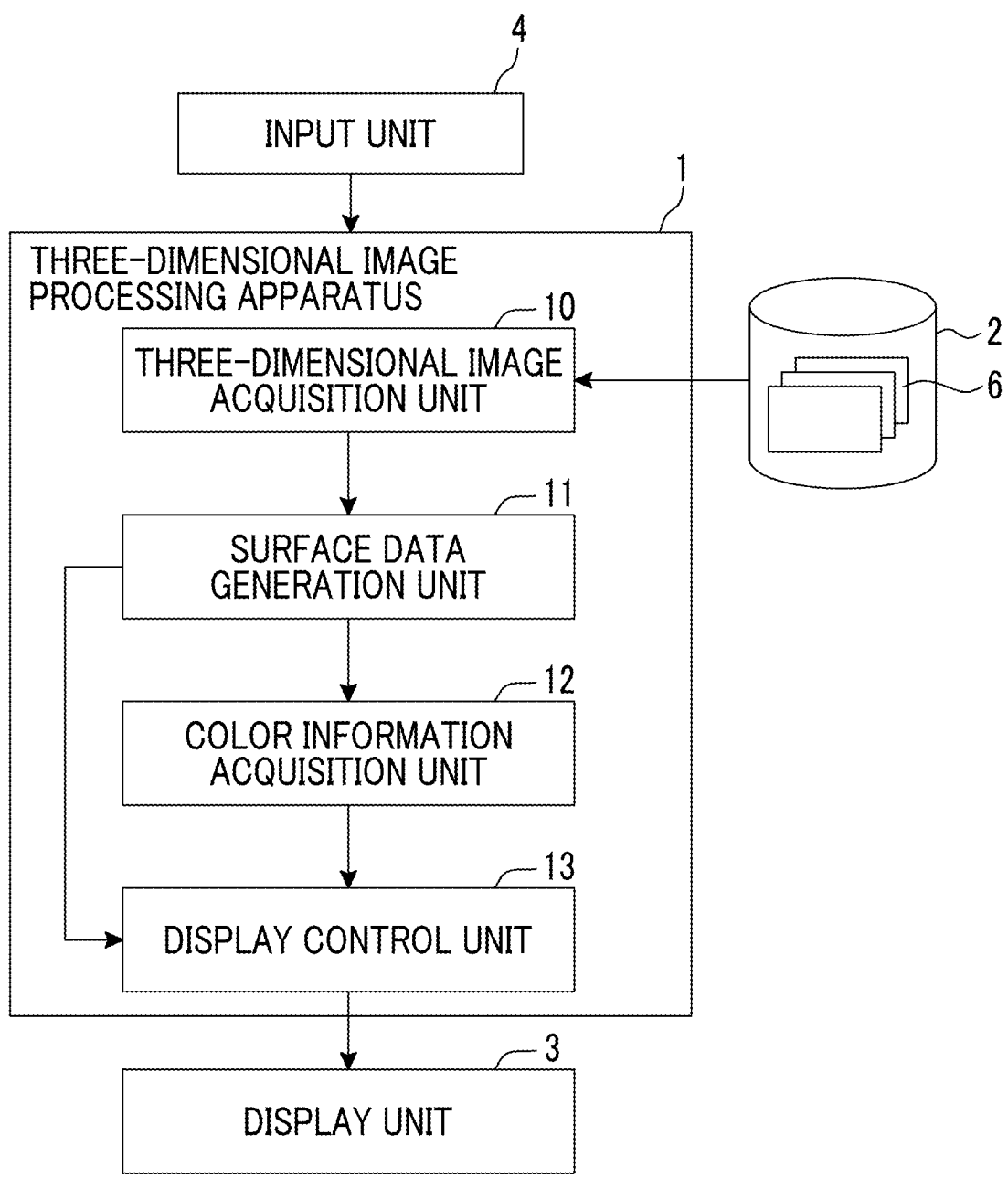
FIG. 1 is a block diagram schematically illustrating the configuration of a three-dimensional image display system using an embodiment of a three-dimensional image processing apparatus according to the invention.

Hereinafter, an embodiment of a three-dimensional image display system using an embodiment of a three-dimensional image processing apparatus according to the invention will be described with reference to the drawings. FIG. 1 is a block diagram schematically illustrating the configuration of the three-dimensional image display system according to this embodiment.

Specifically, as illustrated in FIG. 1, the three-dimensional image display system according to this embodiment comprises a three-dimensional image processing apparatus 1, a medical image storage server 2, a display unit 3, and an input unit 4.

The three-dimensional image processing apparatus 1 is configured by installing a three-dimensional image processing program according to this embodiment in a computer.

The three-dimensional image processing apparatus 1 comprises a central processing unit (CPU), a semiconductor memory, and a storage device such as a hard disk drive or a solid state drive (SSD). The three-dimensional image processing program according to this embodiment is installed in the storage device and the central processing unit executes the three-dimensional image processing program such that a three-dimensional image acquisition unit 10, a surface data generation unit 11, a color information acquisition unit 12, and a display control unit 13 illustrated in FIG. 1 operate.

The three-dimensional image processing program is recorded on a recording medium, such as a digital versatile disc (DVD) or a compact disc read only memory (CD-ROM), is distributed, and is then installed in the computer from the recording medium. Alternatively, the three-dimensional image processing program is stored in a storage device of a server computer connected to the network or a network storage so as to be accessed from the outside. Then, the three-dimensional image processing program is downloaded to the computer in response to a request from the outside and is then installed in the computer.

The three-dimensional image acquisition unit 10 acquires a three-dimensional medical image 6 of a patient which has been captured in advance. The three-dimensional medical image 6 is an image captured by, for example, a computed tomography (CT) apparatus or a magnetic resonance imaging (MRI) apparatus. In this embodiment, a case in which the three-dimensional medical image 6 of the heart of the patient (corresponding to a display target in the invention) is acquired will be described. However, the invention is not limited thereto. The images of the other organs, such as the lungs, the liver, and the head, may be acquired.

The three-dimensional medical image 6 is stored in advance in the medical image storage server 2 together with the identification information of the patient. The three-dimensional image acquisition unit 10 reads the three-dimensional medical image 6 having the identification information of the patient input by the user through, for example, the input unit 4 from the medical image storage server 2 on the basis of the identification information and temporarily stores the three-dimensional medical image 6.

The surface data generation unit 11 extracts a heart region from the three-dimensional medical image 6 acquired by the three-dimensional image acquisition unit 10 and generates surface data indicating a surface of the heart region.

Specifically, the surface data generation unit 11 extracts the heart region using a known method, such as region extraction using a threshold value or object shape recognition, and calculates a boundary surface between the heart region and other regions using, for example, a marching cube method to generate surface data including a polyhedron.

In addition, a method for generating the surface data is not limited thereto and any other known methods can be used as long as they generate the surface data of a polyhedron obtained by sewing a plurality of patches such as polygons.

The color information acquisition unit 12 assigns a color to the surface of the surface data. Specifically, the color information acquisition unit 12 acquires color information by performing a volume rendering process for the three-dimensional medical image 6 of a specific section including vertices of the surface data in a direction from the outside to the inside of planes forming the surface data. Then, the color information acquisition unit 12 assigns a color to the surface of the surface data on the basis of the color information. Hereinafter, a color information acquisition method will be described in more detail.

Figure 2:
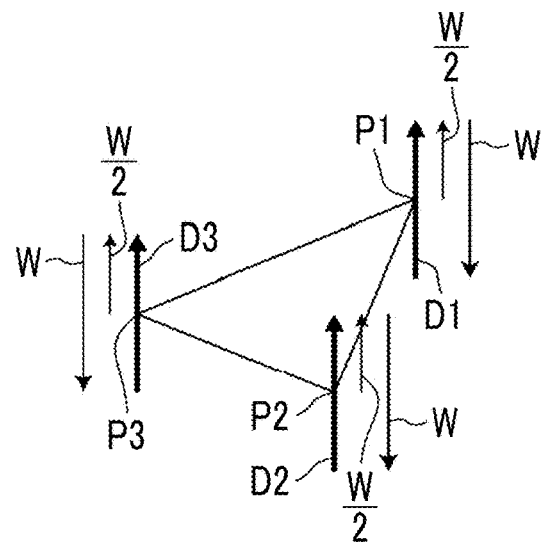
FIG. 2 is a diagram illustrating an example of a method for acquiring color information of each vertex of surface data.

First, a normal direction to the vertices of each of planes forming the surface data is set. Specifically, in a case in which the surface data includes a polygon such as a triangle, normal directions D1 to D3 to vertices P1 to P3 of the triangle are set, respectively, as illustrated in FIG. 2. As a method for setting the normal direction D1, for example, an average value of the normal directions to planes intersecting the vertex P1 may be set as the normal direction D1 to the vertex P1. Similarly, an average value of the normal directions to planes intersecting the vertex P2 is set as the normal direction D2 to the vertex P2 and an average value of the normal directions to planes intersecting the vertex P3 is set as the normal direction D3 to the vertex P3. In addition, the normal directions D1 to D3 are directions from the inside to the outside of the surface data. A method for calculating the normal direction to the vertex is not limited to the above-mentioned method. For example, a curved surface passing through the vertex may be calculated and a normal direction to the curved surface may be calculated.

Then, thicknesses W are set for the normal directions D1 to D3 to the vertices P1 to P3 and a section from a point that is W/2 away from the position of each of the vertices P1 to P3 in the normal directions D1 to D3 to a point that is W away from the point in directions opposite to the normal directions D1 to D3 is set as the specific section. Then, a volume rendering process is performed for the three-dimensional medical image 6 of the specific section from the outside to the inside by a ray casting method to acquire the color information of each of the vertices P1 to P3.

Specifically, a color table in which a voxel value of each voxel of the three-dimensional medical image 6 and a color and opacity corresponding to each voxel value are associated with each other is set in the color information acquisition unit 12 in advance. In the volume rendering process, the color information acquisition unit 12 sets a color and opacity corresponding to the voxel value of each voxel in the specific section, using the color table, adds the colors and opacities corresponding to each of the voxel values in the normal directions D1 to D3 to acquire the color information of each of the vertices P1 to P3.

Then, the color information acquisition unit 12 performs surface rendering for the surface data using the acquired color information of each vertex to assign a color to each plane of the surface data. Specifically, the color information acquisition unit 12 performs an interpolation process using the color information of each vertex to acquire color information between the vertices, thereby assigning a color to each plane of the surface data.

Returning to FIG. 1, the display control unit 13 displays the surface data having the surfaces, to which the colors have been assigned by the color information acquisition unit 12 as described above, on the display unit 3.

The medical image storage server 2 is a computer that stores and manages various types of data and comprises a high-capacity storage device and a database management program. The medical image storage server 2 acquires, for example, the three-dimensional medical image 6 captured in advance from an imaging apparatus, such as a CT apparatus or an MRI apparatus, through the network, stores the three-dimensional medical image 6 in the high-capacity storage device, and manages the three-dimensional medical image 6.

The input unit 4 receives the input of various settings by the user and comprises an input device such as a keyboard or a mouse. For example, the input unit 4 receives the input of the setting of the identification information of the patient. In addition, the input unit 4 according to this embodiment receives a change in the color of a color template used in the volume rendering process. In this embodiment, the input unit 4 corresponds to a color change receiving unit according to the invention.

Figure 3:
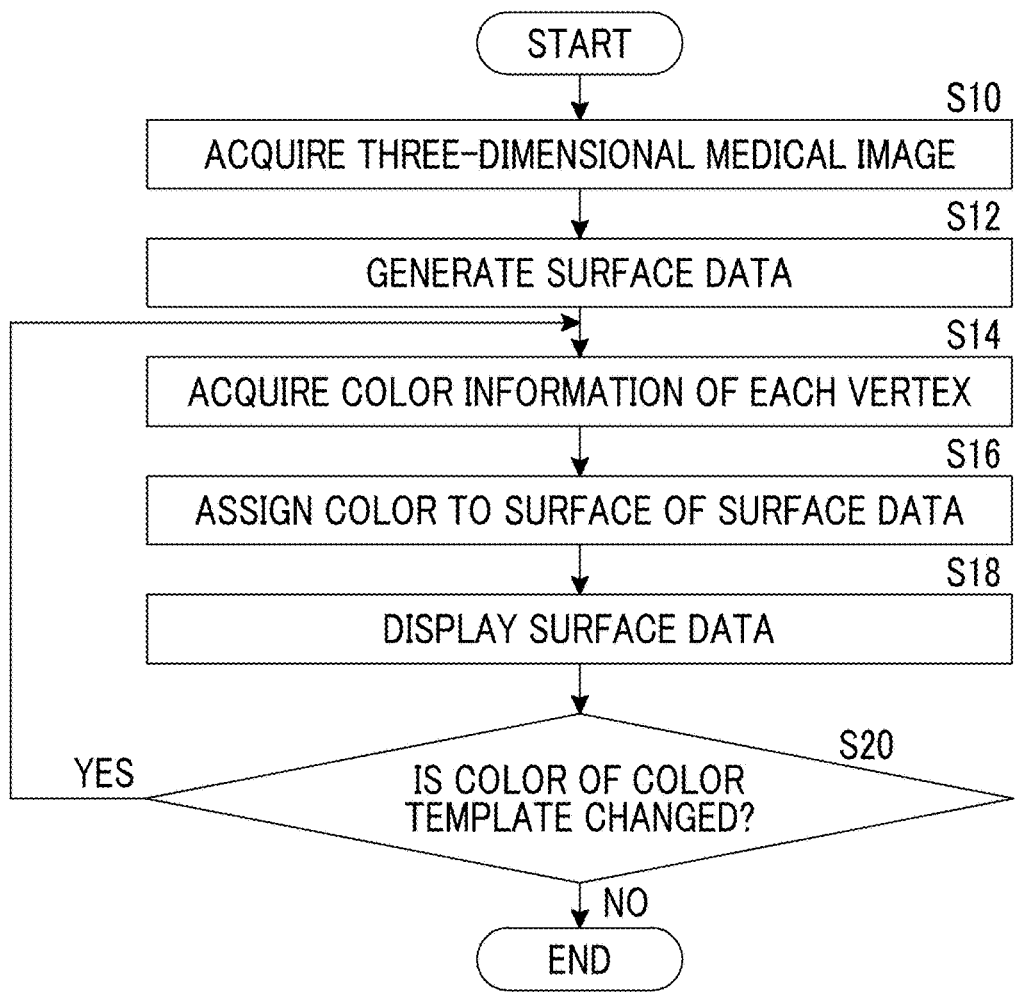
FIG. 3 is a flowchart illustrating the operation of the three-dimensional image display system using an embodiment of the three-dimensional image processing apparatus according to the invention.

Next, the operation of the three-dimensional image display system according to this embodiment will be described with reference to a flowchart illustrated in FIG. 3.

First, the three-dimensional image acquisition unit 10 acquires the three-dimensional medical image 6 of the patient in response to the input of the setting of, for example, the identification information of the patient by the user (S10). In this embodiment, the three-dimensional medical image 6 of the heart is acquired as described above.

Then, the three-dimensional medical image 6 acquired by the three-dimensional image acquisition unit 10 is input to the surface data generation unit 11. The surface data generation unit 11 extracts a heart region from the input three-dimensional medical image 6 and generates surface data indicating the surface of the heart (S12).

Then, the surface data generated by the surface data generation unit 11 is input to the color information acquisition unit 12. The color information acquisition unit 12 performs the volume rendering process for the three-dimensional medical image 6 of a specific section including each vertex of the surface data to acquire the color information of each vertex as described above (S14).

Then, the color information acquisition unit 12 performs surface rendering for the surface data using the color information of each vertex to assign a color to each surface of the surface data (S16).

Then, the display control unit 13 displays the surface data having the surfaces, to which the colors have been assigned, on the display unit 3 (S18).

Then, in a case in which the user sets and inputs a change in the color of the color template with the input unit 4 after the surface data is displayed as described above (S20, YES), the volume rendering process is performed for the three-dimensional medical image 6 of the specific section including each vertex of the surface data again, using the changed color template, to reacquire new color information of each vertex (S14).

Then, surface rendering is performed for the surface data again, using the color information of each vertex, to assign the changed colors to each plane of the surface data (S16).

Then, the display control unit 13 displays the surface data having the planes, to which the changed colors have been assigned, on the display unit 3 (S18).

In a case in which the setting of a change in the color of the color template is not input in S20 (S20, NO), the process ends.

Figure 4A:
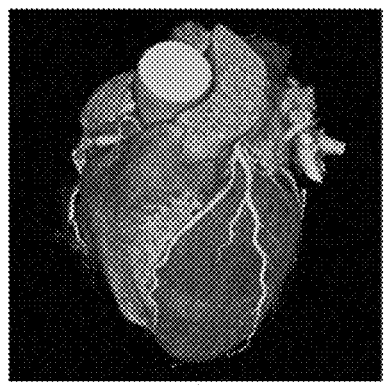
FIG. 4A illustrates an example in which volume rendering is performed for the entire three-dimensional image of the heart.
Figure 4B:
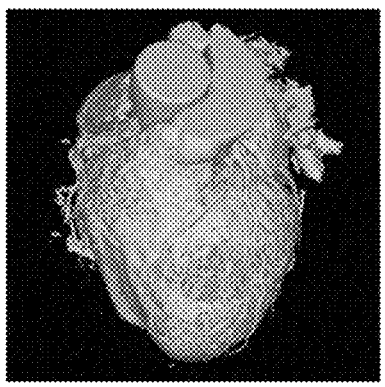
FIG. 4B illustrates an example in which surface data of the heart is displayed in a single color.
Figure 4C:
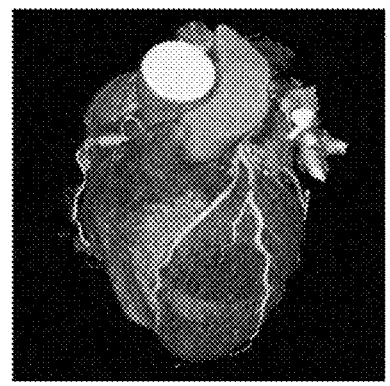
FIG. 4C illustrates an example in which the surface data of the heart is displayed by the three-dimensional image display system illustrated in FIG. 1.

According to the three-dimensional image display system of the above-described embodiment, the color of the surface data is determined by the volume rendering process. Therefore, the surface data can be displayed as in volume rendering. Even in a case in which a plurality of objects are mixed, it is possible to recognize the boundary between the objects and to display the objects in colors similar to the colors of the actual objects. FIG. 4A illustrates an example in which volume rendering is performed for the entire three-dimensional image of the heart. FIG. 4B illustrates an example in which the surface data of the heart is displayed in a single color. FIG. 4C illustrates an example in which the surface data of the heart is displayed by the three-dimensional image display system according to the above-described embodiment.

In addition, colors can be easily adjusted only by changing the color template used in the volume rendering process.

Further, the load of an arithmetic process can be less than that in a case in which the volume rendering process is performed for the entire three-dimensional image and it is possible to display images at a high speed.

In the above-described embodiment, the range of the thickness W having each vertex as the center is set as the specific section and the volume rendering process is performed for the specific section. However, a method for setting the specific section is not limited thereto. For example, any other setting methods may be used as long as the section includes each vertex.

Figure 5:
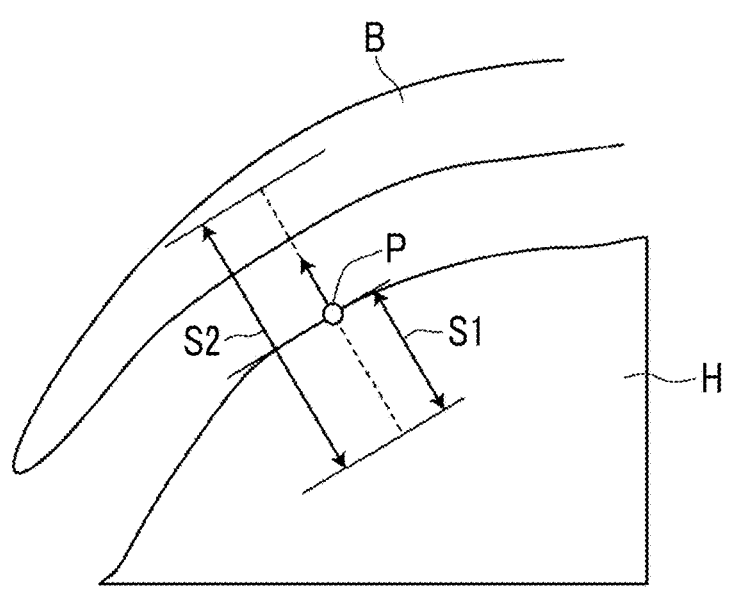
FIG. 5 is a diagram illustrating another method for setting a specific section to be subjected to a volume rendering process.

For example, in some cases, a blood vessel is present at a position that is slightly away from the surface of the heart. For example, in some cases, a blood vessel region B that is not continuous from a vertex P on the surface of a heart region H in a normal direction outside the surface of the heart region H as illustrated in FIG. 5. In this case, if a predetermined thickness range having each vertex as the center is set as a specific section S2 as in the above-described embodiment, the volume rendering process is performed for a portion including the discontinuous blood vessel region B. In this case, ray casting in the volume rendering process is likely to be stopped in the blood vessel region B. As a result, an unintended color is likely to be assigned to the plane of the surface data.

Therefore, for example, as illustrated in FIG. 5, a section in which the heart region H is continuous from the vertex P in the normal direction and which has a predetermined thickness may be set as a specific section S1 and the volume rendering process may be performed for the specific section S1 to acquire the color information of the vertex P. In addition, as a method for calculating the section in which the heart region H is continuous, the information of the extracted heart region H may be used, or the opacity of the color template used in volume rendering may be used and a region in which an opacity equal to or greater than 0 is continuous may be used as the continuous section.

In the above-described embodiment, the input unit 4 may receive a change in the thickness of the specific section.

What is claimed is:

1. A three-dimensional image processing apparatus comprising:
    a surface data generation circuit that extracts a display target from a three-dimensional image and generates surface data indicating a surface of the display target;
    a color information acquisition circuit that performs a volume rendering process for the three-dimensional image of a specific section including vertices of the surface data in a direction from an outside to an inside of planes forming the surface data to acquire color information and assigns a color to the surface of the surface data on the basis of the color information; and
    a display control circuit that displays the surface data having the surface, to which the color has been assigned, on a display unit,
    wherein the color information acquisition circuit sets a normal direction to a vertex of each plane forming the surface data and performs the volume rendering process in the normal direction from the outside to the inside of each plane forming the surface data, and
    wherein the color information acquisition circuit calculates the normal direction to the vertex on the basis of normal directions to a plurality of planes intersecting the vertex.

2. The three-dimensional image processing apparatus according to claim 1,
    wherein the color information acquisition circuit calculates an average of the normal directions to the plurality of planes intersecting the vertex to calculate the normal direction to the vertex.

3. The three-dimensional image processing apparatus according to claim 1,
    wherein, in the volume rendering process, the color information acquisition circuit sets a color and opacity corresponding to a voxel value of each voxel in the specific section and adds the color and the opacity corresponding to the voxel value along the normal direction.

4. The three-dimensional image processing apparatus according to claim 3, further comprising:
    a color change receiving circuit that receives a change in a color depending on the voxel value.

5. The three-dimensional image processing apparatus according to claim 1,
    wherein the color information acquisition circuit performs the volume rendering process for a three-dimensional image of the specific section having vertices of the surface data as centers to acquire the color information on each vertex and performs an interpolation process for the color information on each vertex to assign the color to the surface of the surface data.

6. The three-dimensional image processing apparatus according to claim 1,
    wherein the color information acquisition circuit sets a section in which the display target is continuous from each vertex of the surface data in the normal direction as the specific section.

7. A three-dimensional image processing method comprising:
- extracting a display target from a three-dimensional image and generating surface data indicating a surface of the display target;
- performing a volume rendering process for the three-dimensional image of a specific section including vertices of the surface data in a direction from an outside to an inside of planes forming the surface data to acquire color information;
- assigning a color to the surface of the surface data on the basis of the color information;
- displaying the surface data having the surface, to which the color has been assigned, on a display unit,
- setting a normal direction to a vertex of each plane forming the surface data and performing the volume rendering process in the normal direction from the outside to the inside of each plane forming the surface data, and
- calculating the normal direction to the vertex on the basis of normal directions to a plurality of planes intersecting the vertex.

8. A non-transitory computer-readable recording medium storing therein a three-dimensional image processing program that causes a computer to function as:

- a surface data generation circuit that extracts a display target from a three-dimensional image and generates surface data indicating a surface of the display target;
- a color information acquisition circuit that performs a volume rendering process for the three-dimensional image of a specific section including vertices of the surface data in a direction from an outside to an inside of planes forming the surface data to acquire color information and assigns a color to the surface of the surface data on the basis of the color information; and
- a display control circuit that displays the surface data having the surface, to which the color has been assigned, on a display unit,
- wherein the color information acquisition circuit sets a normal direction to a vertex of each plane forming the surface data and performs the volume rendering process in the normal direction from the outside to the inside of each plane forming the surface data, and
- wherein the color information acquisition circuit calculates the normal direction to the vertex on the basis of normal directions to a plurality of planes intersecting the vertex.

* * * * *